US 6,568,607 B2

(12) United States Patent
Boswell et al.

(10) Patent No.: US 6,568,607 B2
(45) Date of Patent: May 27, 2003

(54) EMITTER

(75) Inventors: Michael J. Boswell, El Cajon, CA (US); Michael D. Kerr, El Cajon, CA (US); Dean W. James, Clovis, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/100,228

(22) Filed: Mar. 15, 2002

(65) Prior Publication Data

US 2002/0166907 A1 Nov. 14, 2002

Related U.S. Application Data

(60) Provisional application No. 60/276,365, filed on Mar. 16, 2001.

(51) Int. Cl.⁷ .............................................. B05B 15/00
(52) U.S. Cl. ...................... 239/542; 239/547; 239/569; 239/570
(58) Field of Search ................................ 239/271, 542, 239/547, 569, 570

(56) References Cited

U.S. PATENT DOCUMENTS

| | | | |
|---|---|---|---|
| 3,895,085 A | | 7/1975 | Suzuki et al. ............... 264/154 |
| 3,981,452 A | | 9/1976 | Eckstein ..................... 239/542 |
| 4,092,002 A | * | 5/1978 | Grosse et al. ............... 239/542 |
| 4,121,771 A | * | 10/1978 | Hendrickson ............... 239/542 |
| 4,307,841 A | | 12/1981 | Mehoudar et al. .......... 239/542 |
| 4,460,129 A | * | 7/1984 | Olson ........................ 239/542 |
| 4,735,363 A | | 4/1988 | Shfaram et al. ............. 239/542 |
| 4,817,875 A | | 4/1989 | Karmeli et al. ............. 239/542 |
| 5,022,940 A | | 6/1991 | Mehoudar .................... 156/64 |
| 5,052,625 A | * | 10/1991 | Ruskin ....................... 239/542 |
| 5,111,996 A | | 5/1992 | Eckstein ..................... 239/542 |
| 5,122,044 A | | 6/1992 | Mehoudar .................. 425/114 |
| 5,271,786 A | | 12/1993 | Gorney et al. .............. 156/229 |
| 5,324,371 A | | 6/1994 | Mehoudar ..................... 156/64 |
| 5,324,379 A | | 6/1994 | Eckstein ................. 156/244.13 |
| 5,586,727 A | * | 12/1996 | Shekalim .................... 239/542 |
| 5,620,143 A | * | 4/1997 | Delmer et al. .............. 239/542 |
| 5,636,797 A | | 6/1997 | Cohen ......................... 239/542 |
| 5,676,897 A | * | 10/1997 | Dermitzakis ................ 264/167 |
| 5,744,779 A | | 4/1998 | Buluschek ............. 219/121.71 |
| 5,855,324 A | * | 1/1999 | DeFrank et al. ............ 239/542 |
| 6,015,102 A | * | 1/2000 | Daigle et al. ............... 239/542 |
| 6,027,048 A | * | 2/2000 | Mehoudar .................... 239/542 |
| 6,039,270 A | * | 3/2000 | Dermitzakis ................ 239/542 |
| 6,116,523 A | * | 9/2000 | Cabahug et al. ............ 239/542 |
| 6,120,634 A | * | 9/2000 | Harrold et al. ............. 156/203 |
| 6,179,949 B1 | * | 1/2001 | Buluschek ............. 156/244.13 |
| 6,206,305 B1 | * | 3/2001 | Mehoudar .................... 239/542 |
| 6,250,571 B1 | * | 6/2001 | Cohen ......................... 239/542 |
| 6,280,554 B1 | | 8/2001 | Lambert et al. ........ 156/244.12 |
| 6,302,338 B1 | | 10/2001 | Cohen ......................... 239/542 |
| 6,308,902 B1 | * | 10/2001 | Huntley ...................... 239/542 |
| 6,343,616 B1 | * | 2/2002 | Houtchens .................. 239/542 |
| 6,371,390 B1 | * | 4/2002 | Cohen ......................... 239/542 |
| 6,382,530 B1 | * | 5/2002 | Perkins ....................... 239/542 |
| 6,403,013 B1 | * | 6/2002 | Man ............................ 264/477 |
| 6,461,468 B1 | * | 10/2002 | Cohen .................... 156/244.13 |
| 6,464,152 B1 | * | 10/2002 | Bolinis et al. .............. 239/542 |
| 2002/0074434 A1 | * | 6/2002 | Delmer ........................ 239/542 |
| 2002/0113147 A1 | * | 8/2002 | Huntley ...................... 239/542 |

* cited by examiner

Primary Examiner—Robin O. Evans
(74) Attorney, Agent, or Firm—IPLM Group, P.A.

(57) ABSTRACT

An emitter (30) has a body section (40) and an outlet chamber member (50). The outlet chamber member (50) has wings (52, 53) that have free ends. The free ends are deformable to form a number of varying sized diameters so that the emitter (30) may be used in various diameter conduits (100). The emitter (30) may also have a deeper well portion for use in attaching a fitting (90) thereto. The emitter (300) has a first chamber (332) and a second chamber (352) which also provide for a deeper portion for use in attachment of a fitting (90) thereon.

14 Claims, 16 Drawing Sheets

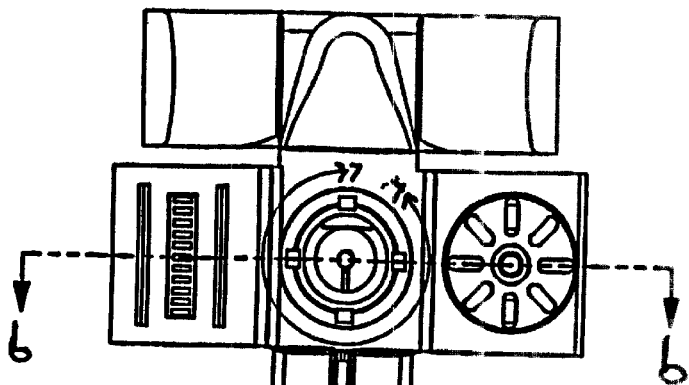
Fig. 5
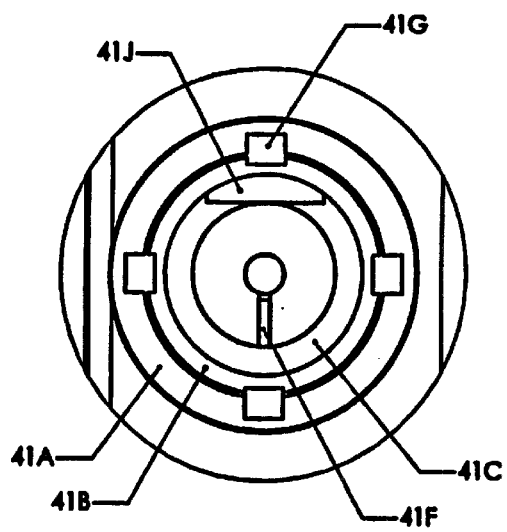
FIGURE 7
Fig. 6
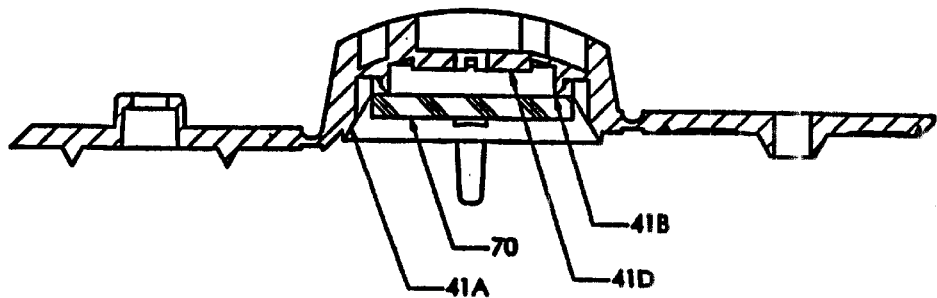

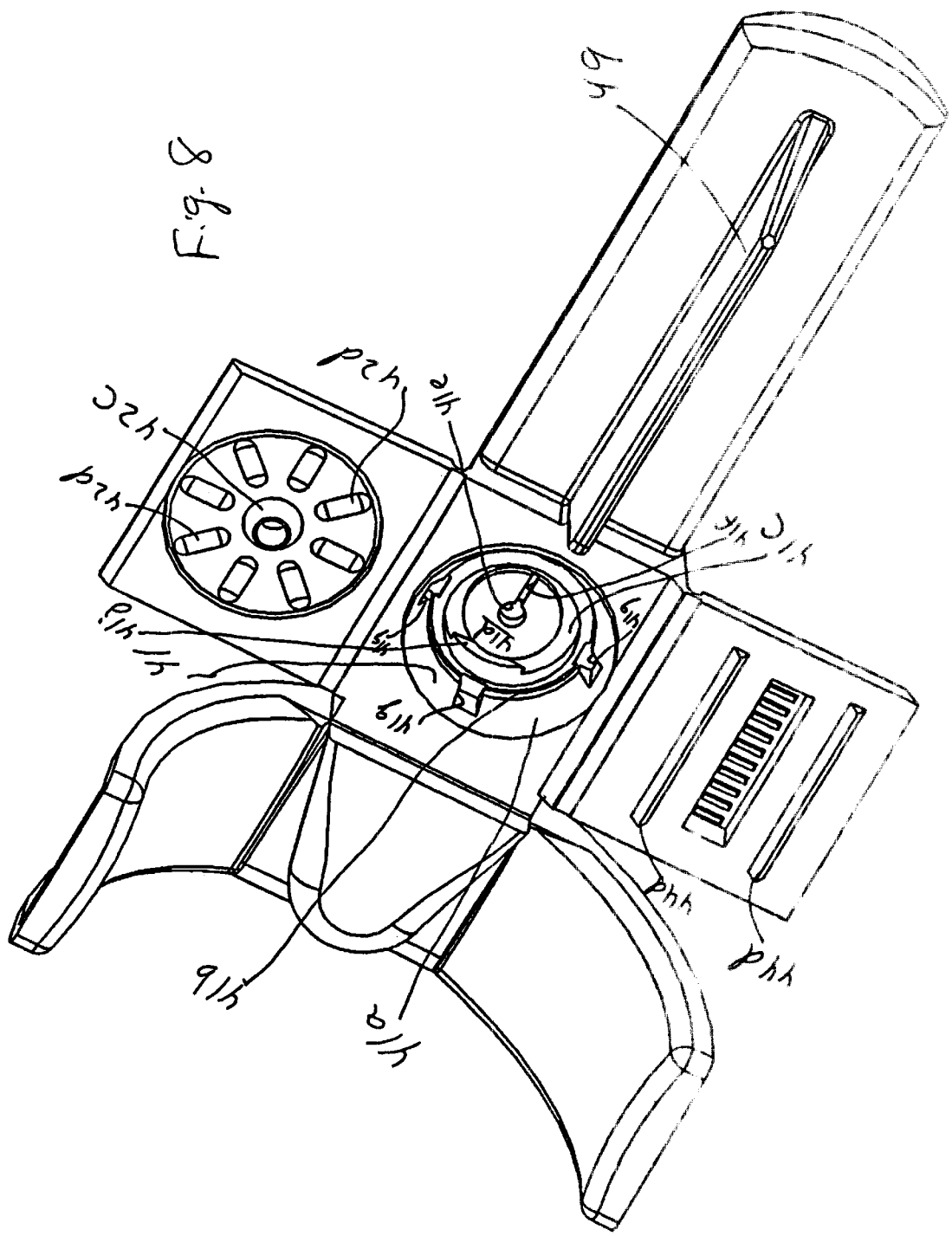

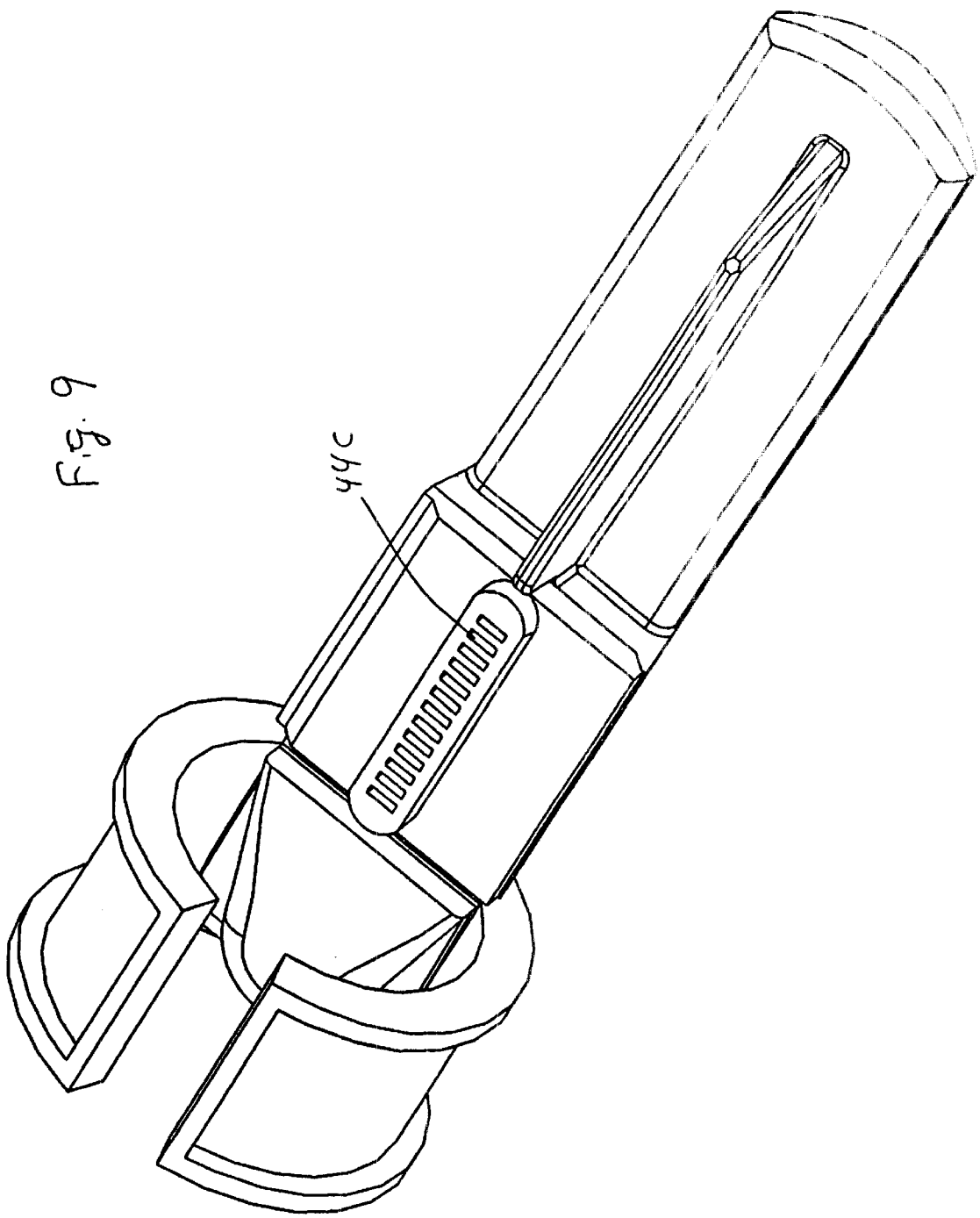

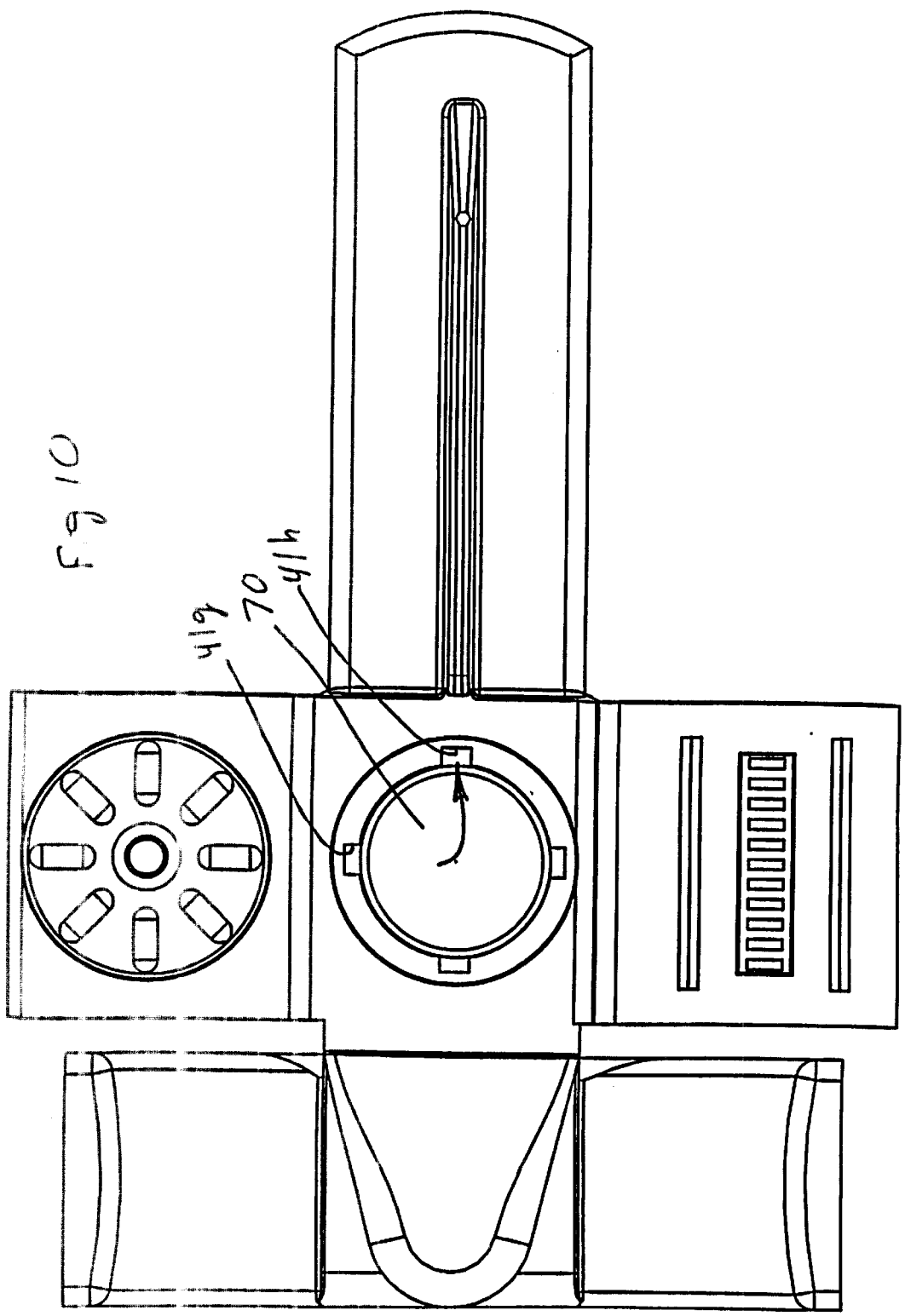

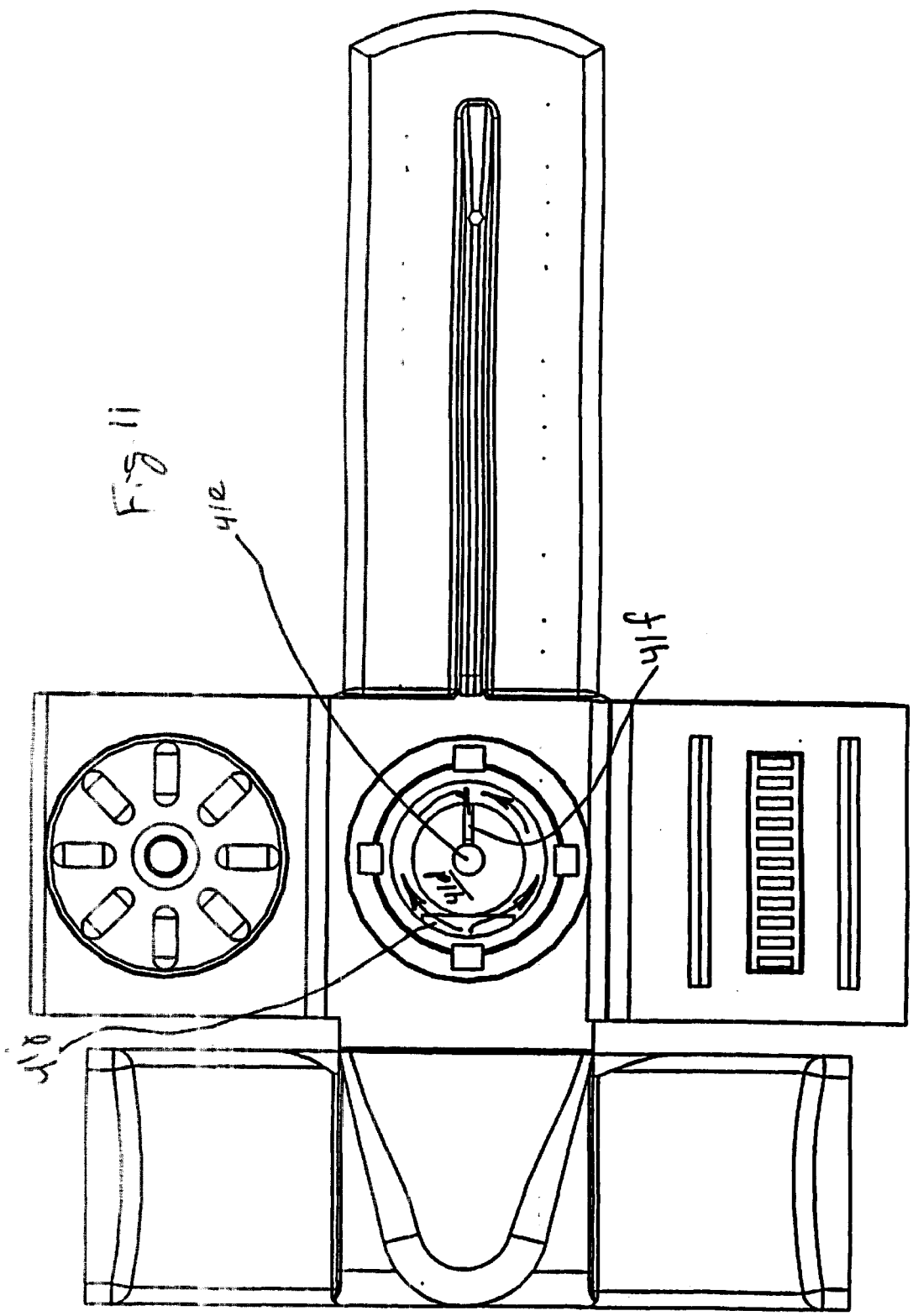

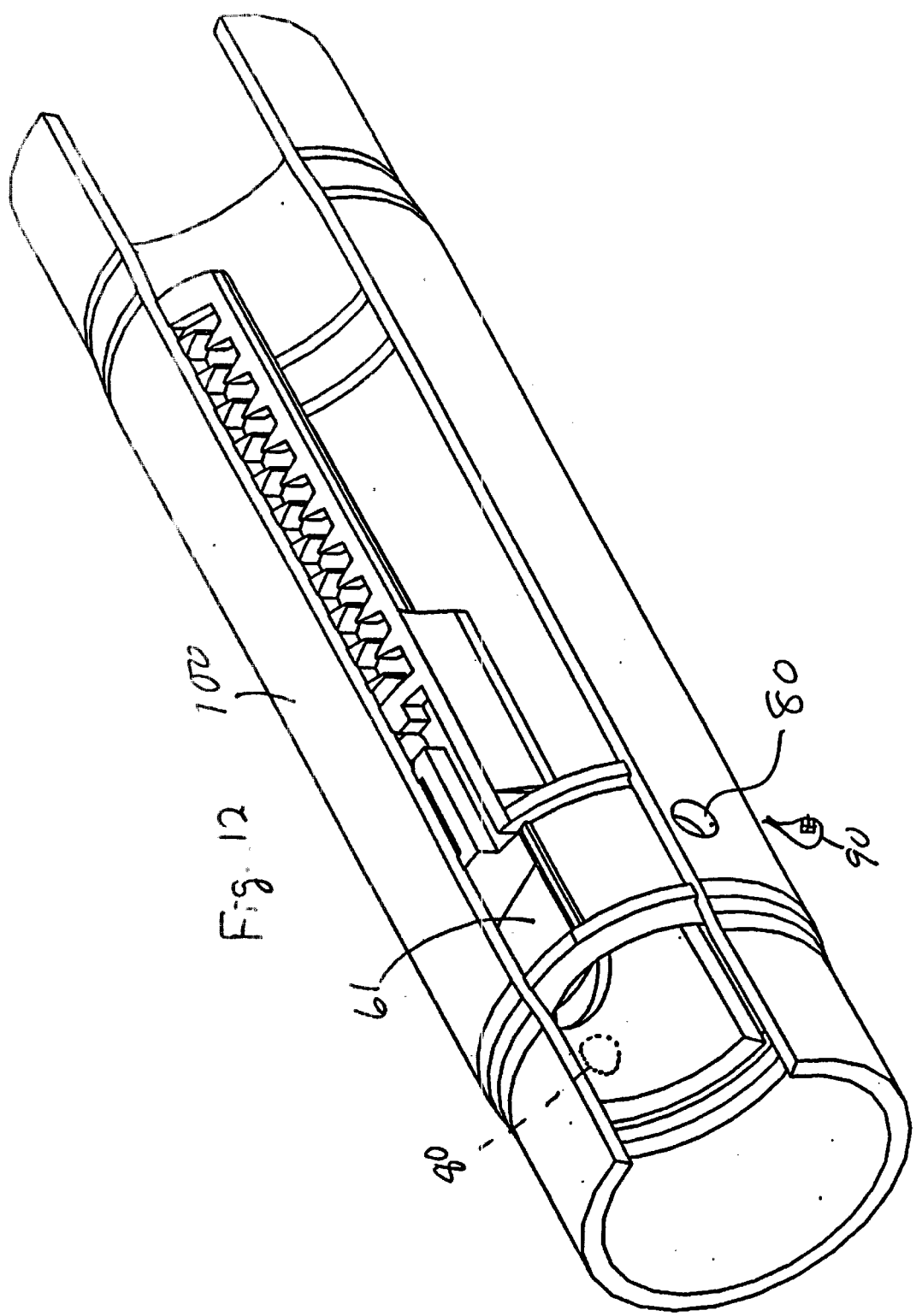

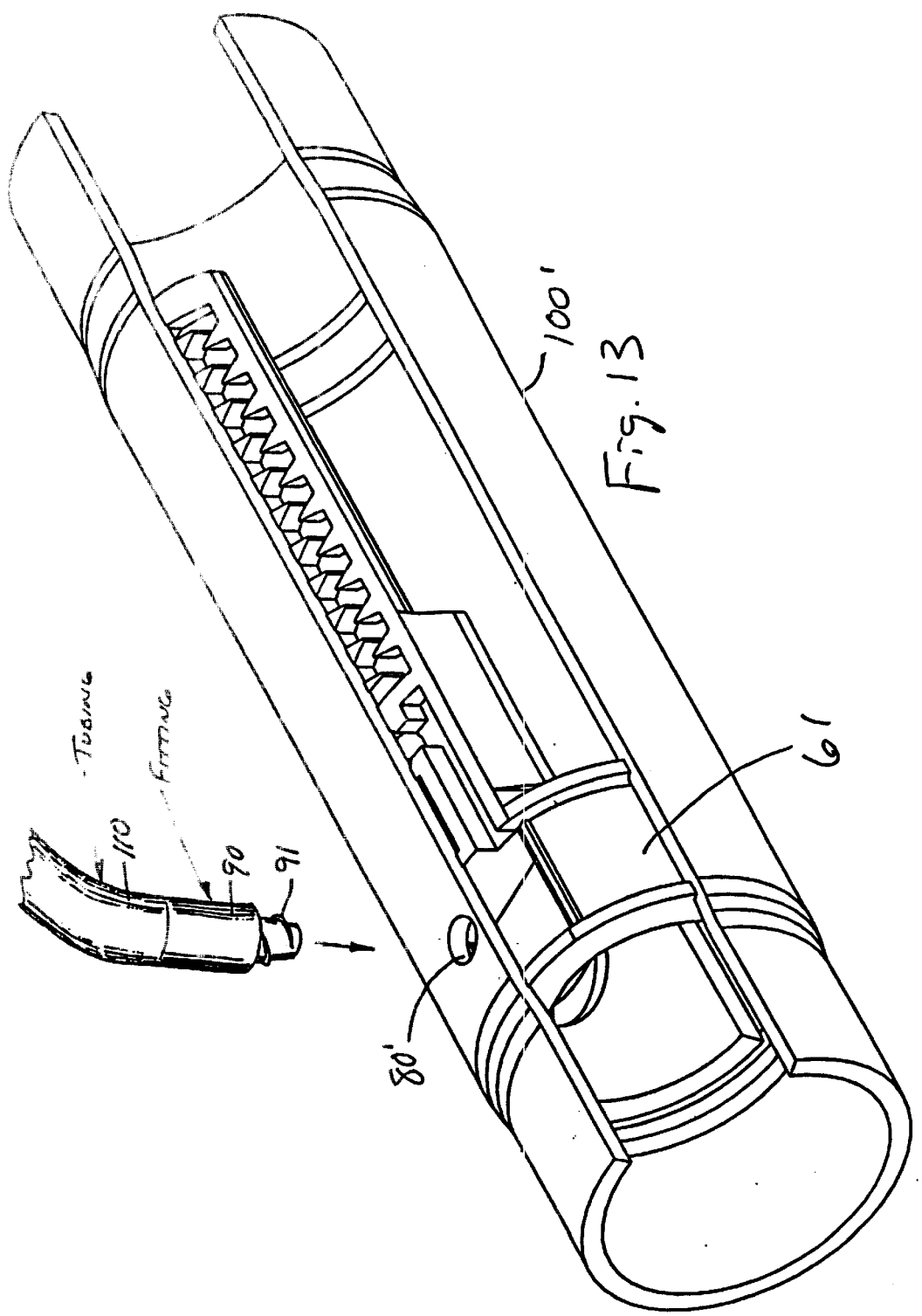

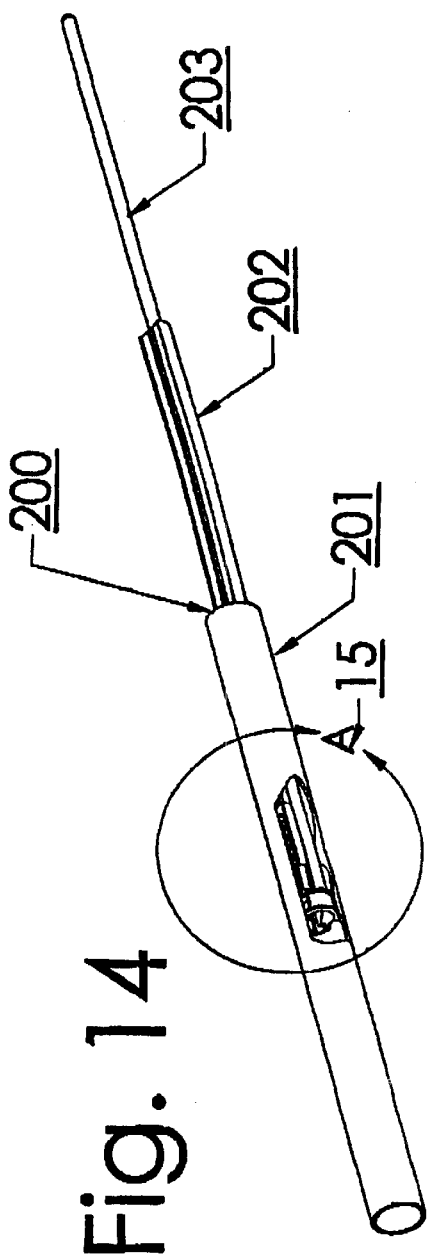
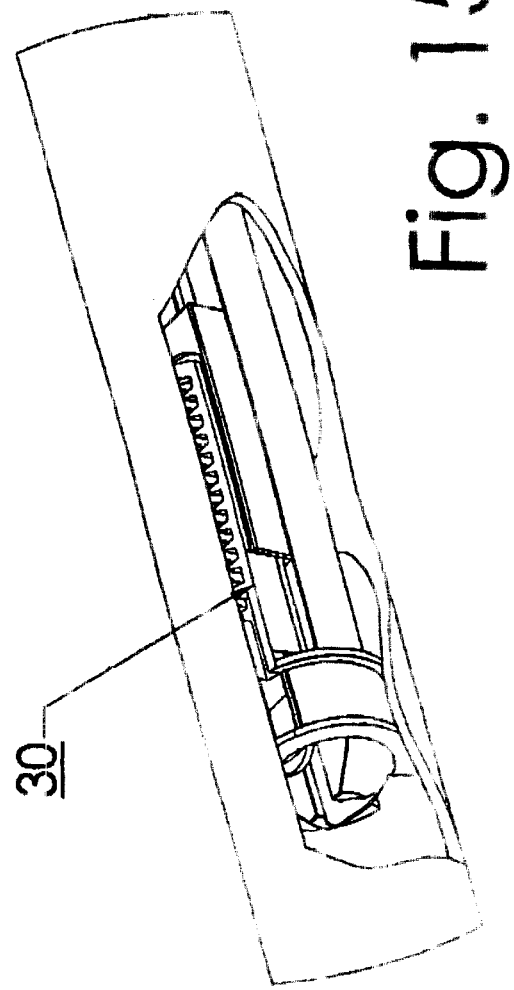

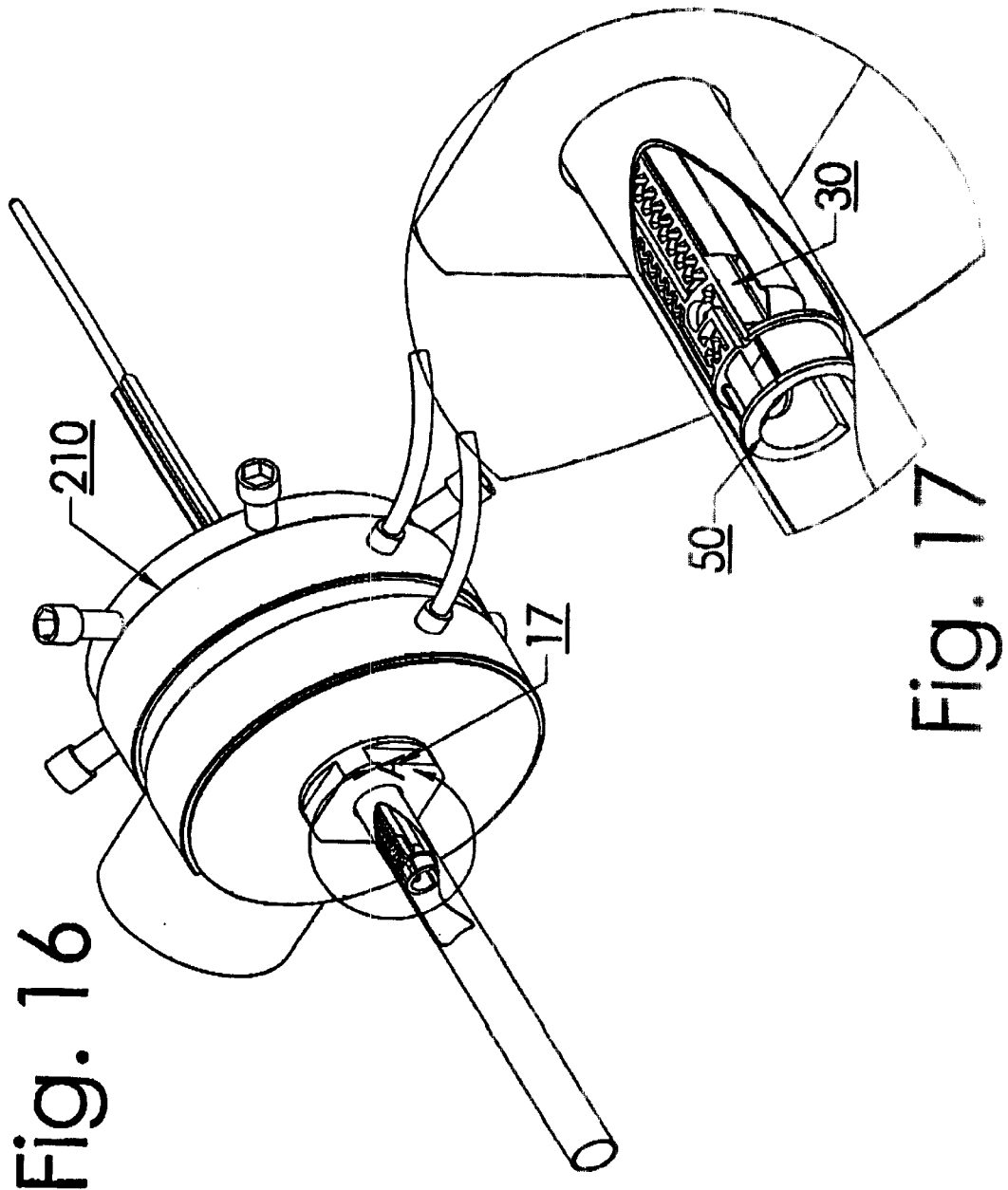

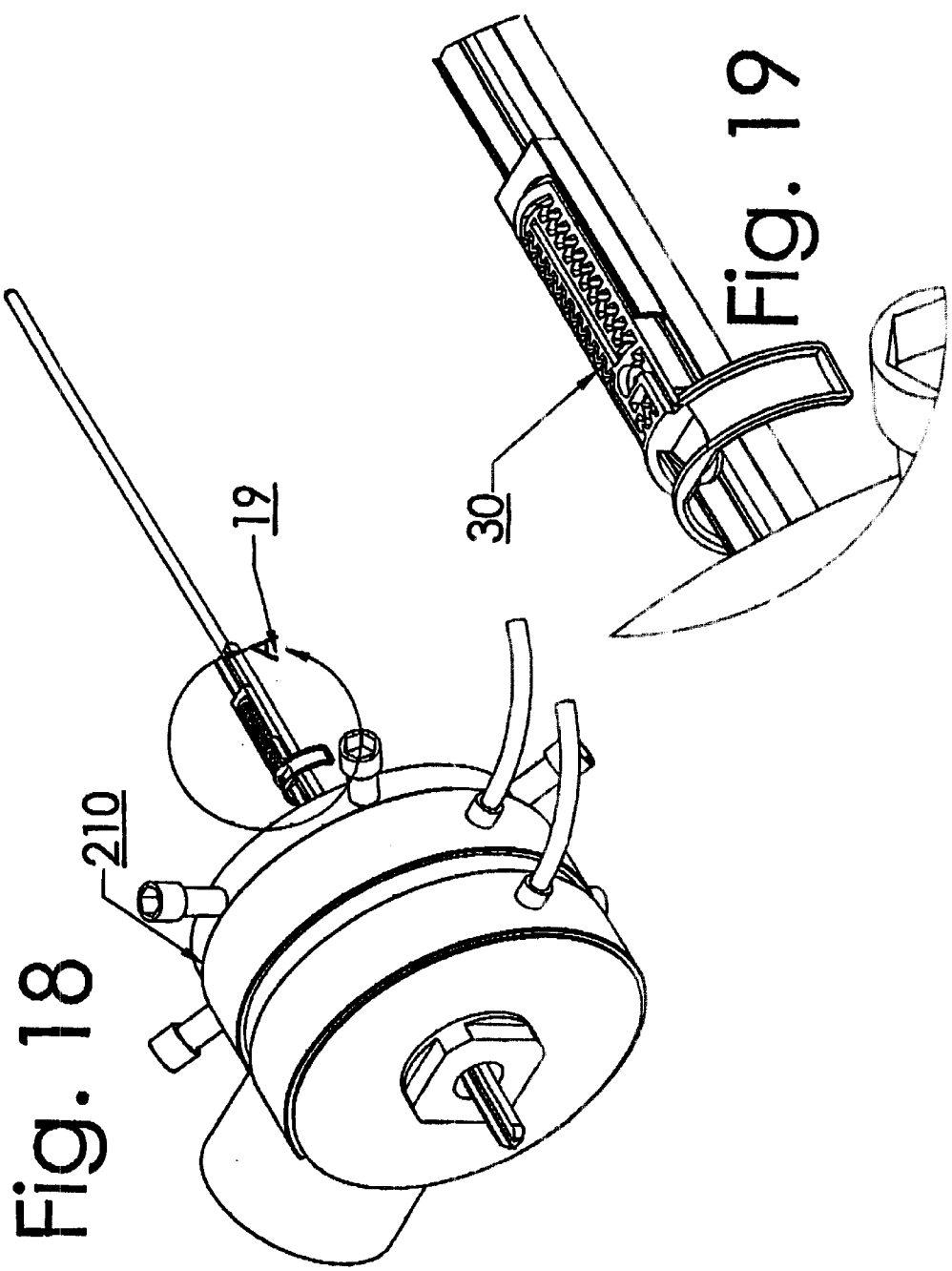

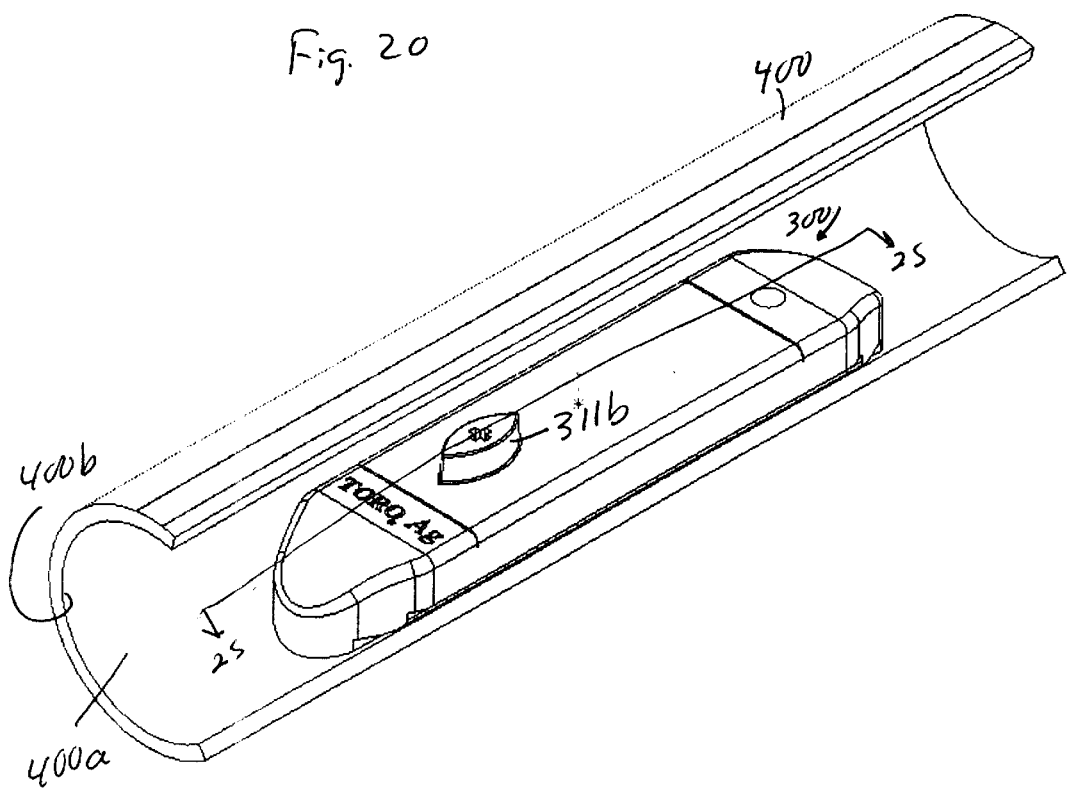

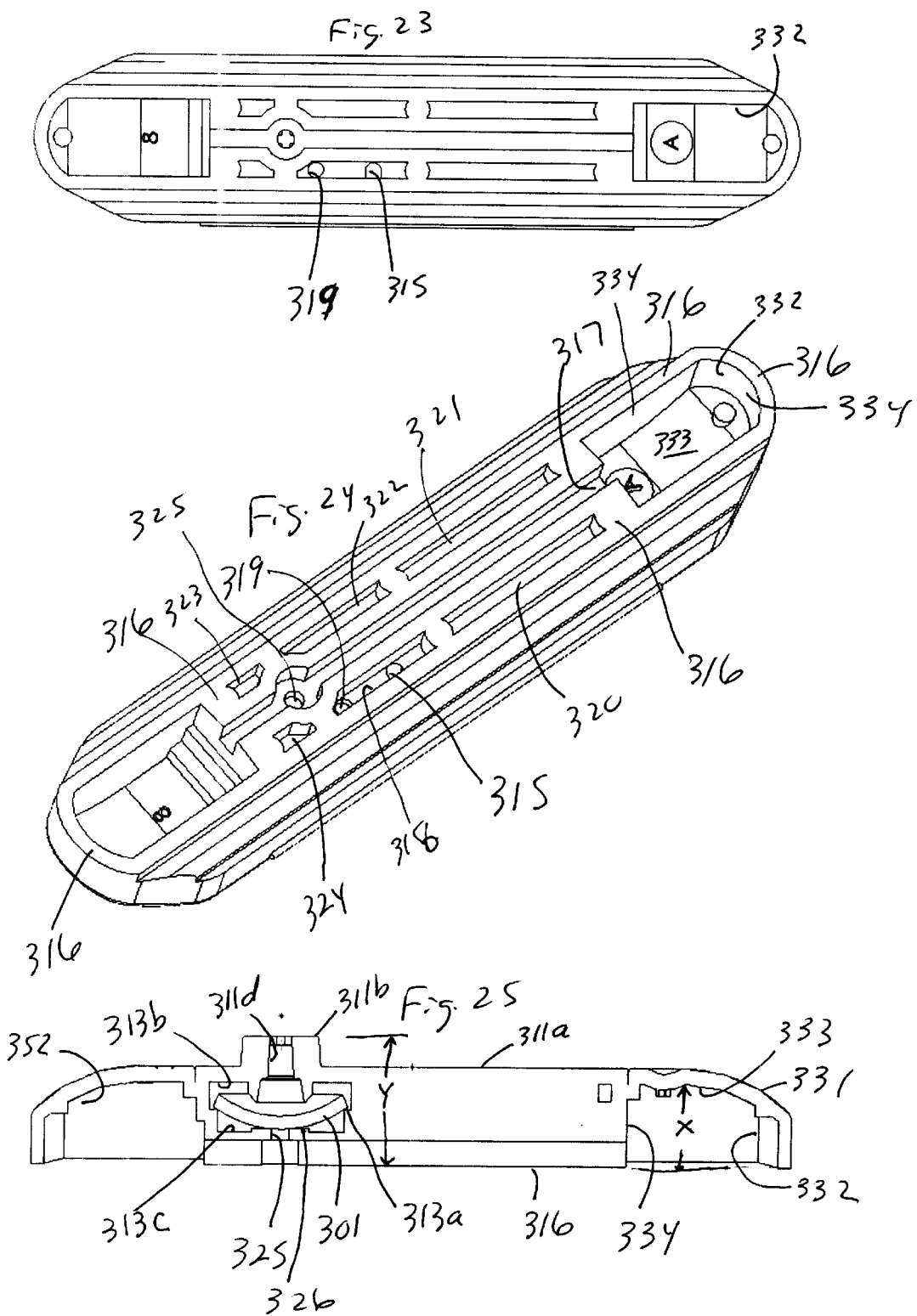

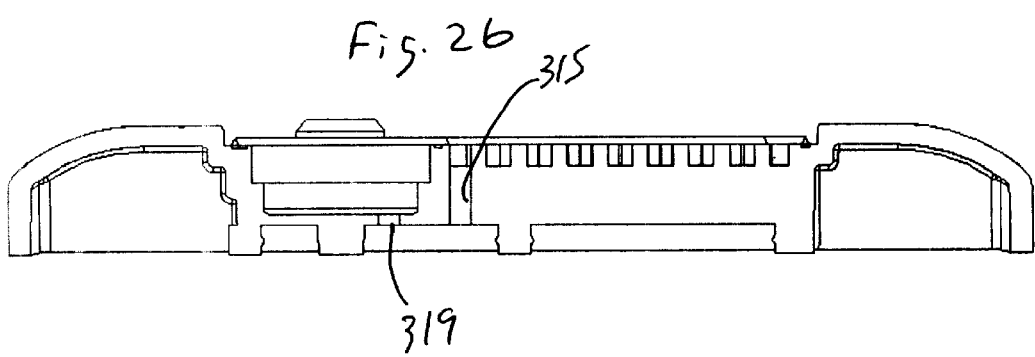

EMITTER

This application claims benefit of provisional application Serial No. 60/276,365 filed Mar. 16, 2001, entitled "Emitter".

BACKGROUND OF THE INVENTION

1. Field of the Invention

This invention relates generally to a drip irrigation emitter and more particularly to an emitter that is able to be inserted in various diameters and wall thicknesses of tubing and allow for one or more outlet holes displaced around the circumference to be made in the tube. The invention is also an emitter having a chamber of sufficient depth to allow for the connection of a length of exit tubing.

2. Description of the Prior Art

Two different varieties of drip irrigation emitters are known in the art. All drip irrigation emitters are associated in some way with a conduit line through which a pressurized fluid may flow. The fluid can be anything, but is typically water for growing plants, either by itself or with dissolved additives, such as fertilizers or nutrients. Drip irrigation emitters may be attached along the outside of the conduit line, or they may be inserted into the inside of a conduit line that allows fluid to reach the outside. In every drip irrigation emitter, there is some means for allowing the fluid inside of the line to reach the outside at a specified rate of flow.

For those emitters that are inserted into the conduit line, there are two general types. The first is a cylindrical emitter such as that shown in U.S. Pat. No. 5,628,462. Existing cylindrical style emitters are made to fit one size of conduit only. That is, a 16-millimeter diameter conduit takes a different sized cylindrical emitter than does a 20-millimeter diameter conduit. The cylindrical emitters form a cylindrical outlet chamber just prior to the exiting of the water from the conduit. Therefore, two holes are able to be drilled into the conduit and still connect with the outlet chamber of the emitter.

Another style of emitter is a substantially flat emitter that is heat welded at axially spaced apart locations on the inner surface of the conduit. Such an emitter is shown in U.S. Pat. No. 4,307,841. Such flat or non-cylindrical emitters can be inserted into various diameters of tubing, but typically only allow one exit hole to be drilled into the tube. Because these "flat emitters" only cover a small fraction of the radius of the hose, it is not possible to form outlet holes which are radially displaced from each other.

In the case of drip tubing laid on the ground surface, it is known that windborne sand and debris can collect in outlet holes which are facing vertically upwards in orientation on the drip tubing, and that these holes can thus become clogged. Therefore it is advantageous to have two or more circumferentially spaced outlet holes at each emitter, thus ensuring that if one hole becomes clogged, another hole will remain open. Outlet holes can be occluded by various means, it is therefore desirable to have multiple outlet holes. The use of longitudinally spaced outlet holes may also be utilized.

The present invention addresses the problems associated with the prior art devices and provides for an emitter which may be used in various sized conduits and allows for two or more outlet holes to be drilled in the tube at axially spaced apart locations.

Still further, the present invention allows for a fitting to be inserted through the conduit into an exit chamber, thereby allowing for precise watering of plants.

SUMMARY OF THE INVENTION

In one embodiment, the invention is a drip irrigation emitter. The emitter is operatively connected in a bore of a conduit having an inner wall with a circumference. The emitter includes a body section. The body section includes a body member having an inlet formed in the body member, the inlet in fluid communication with the bore of the conduit. A pressure reducing passageway is in fluid communication with the inlet and an outlet. The body section has a contact surface. The contact surface is for operatively connecting the emitter to the conduit. The contact surface is sized to be in contact with less than 180 degrees of the circumference of the inner wall. A first outlet chamber member is operatively connected to the body section. The first outlet chamber member includes a bottom wall operatively connected to a side wall. The bottom wall, side wall and inner wall of the conduit forms a first chamber and the first chamber has a height from the bottom wall to the inner wall of the conduit. The first chamber has an opening in fluid communication with the outlet of the body section. The height of the first chamber is at least 25 percent of the thickness of the body section, thereby allowing for insertion of a fitting through the conduit into the first chamber.

In another embodiment, the invention is a pressure compensating drip emitter. The emitter is operatively connected in a bore of a conduit having an inner wall with a circumference. The emitter includes a body section. The body section includes a body member having an inlet formed in the body member. The inlet is in fluid communication with the bore of the conduit. A pressure reducing passageway is in fluid communication with the inlet and an outlet. The body section has a contact surface. The contact surface is for operatively connecting the emitter to the conduit. The contact surface is sized to be in contact with less than 180 degrees of the circumference of the inner wall. A reservoir is formed in the body section, the reservoir positioned between the inlet and the outlet. A resilient member is supported across the reservoir, wherein the reservoir has a first cavity and a second cavity. The pressure reducing passageway has a first end in fluid communication with the first cavity and a second end in fluid communication with the second cavity. A first outlet chamber member is operatively connected to the body section. The first outlet chamber member includes a bottom wall operatively connected to a side wall. The bottom wall, side wall and inner wall of the conduit forms a first chamber. The first chamber has a height from the bottom wall to the inner wall of the conduit. The first chamber has an opening in fluid communication with the outlet of the body section. The height of the first chamber is at least 25 percent of the thickness of the body section, thereby allowing for insertion of a fitting through the conduit into the first chamber. When pressure in the conduit increases, the resilient member deflects towards the outlet, thereby compensating for pressure changes in the conduit.

In another embodiment, the invention is a drip irrigation emitter. The emitter is operatively connected in a bore of a conduit, the bore having a generally circular cross section. The emitter includes a body section having a body member with an inlet formed in the body member in fluid communication with the bore of the conduit. The body section also includes an outlet and a pressure reducing labyrinth in fluid communication with the inlet and outlet. The body member has a cross-section that is less than 180 degrees in cross section of the conduit. An outlet chamber member is operatively connected to the body section and includes a curved section. The curved section and conduit defining a chamber.

An opening in the chamber is in fluid communication with the outlet of the body section and the curved section extends more than 180 degrees around the bore of the conduit.

In another embodiment, the invention is a drip irrigation emitter. The emitter is operatively connected in a bore of a conduit, the bore having a generally circular cross section. The emitter includes a body section having a body member with an inlet formed in the body member in fluid communication with the bore of the conduit. The body section also includes an outlet and a pressure reducing labyrinth in fluid communication with the inlet and outlet. The body member has a cross section that is less than 180 degrees in cross section of the conduit. An outlet chamber member is operatively connected to the body section and includes a curved section. The curved section and conduit defining a chamber. An opening in the chamber is in fluid communication with the outlet of the body section and the curved section extends more than 180 degrees around the bore of the conduit. The curved section has a bottom member, the bottom member having a first section and a second section, wherein the first section is located to provide a greater depth for the chamber than the second section, thereby allowing for insertion of a fitting into the chamber proximate the first section.

BRIEF DESCRIPTION OF THE DRAWINGS

FIG. 5 is a bottom view of the emitter shown in FIG. 1;

FIG. 6 is a cross sectional view of the emitter shown in FIG. 5 taken generally along the lines 6—6;

FIG. 7 is an enlarged view of the emitter shown in FIG. 5 taken generally along the line 7—7;

FIG. 8 is a perspective view of the emitter shown in FIG. 1 shown generally from below;

FIG. 9 is a perspective view of the emitter shown in FIG. 1 from below in an assembled condition;

FIG. 10 is a bottom plan view of the emitter shown in FIG. 1 with a diaphragm inserted;

FIG. 11 is a bottom plan view of the emitter shown in FIG. 10 with the diaphragm removed;

FIG. 12 is a cutaway perspective view of the emitter shown in FIG. 1 assembled in a hose;

FIG. 13 is a cutaway and exploded perspective view showing the emitter of FIG. 1 in a second conduit;

FIG. 14 is a perspective view of the emitter during insertion;

FIG. 15 is an enlarged perspective view showing the method of insertion of FIG. 14 taken generally along the lines 15—15;

FIG. 16 is a perspective view showing the method of insertion through a die head;

FIG. 17 is an enlarged perspective view of the method of insertion shown in FIG. 16 taken generally along the lines 17—17;

FIG. 18 is a perspective view showing the method of insertion at a later stage;

FIG. 19 is an enlarged view of the method of insertion shown in FIG. 18 taken generally along the lines 19—19;

FIG. 20 is a perspective view of another embodiment of the present invention assembled in a conduit;

FIG. 23 is a bottom plan view of the emitter shown in FIG. 20;

FIG. 24 is a perspective view of the bottom of the emitter shown in FIG. 20;

FIG. 25 is a cross sectional view of the emitter shown in FIG. 20 taken generally along the lines 25—25; and FIG. 26 is a cross sectional view of the emitter shown in FIG. 22 taken generally along the lines 26—26, except with the door in the closed position.

DETAILED DESCRIPTION OF THE PREFERRED EMBODIMENT

Figure 1:
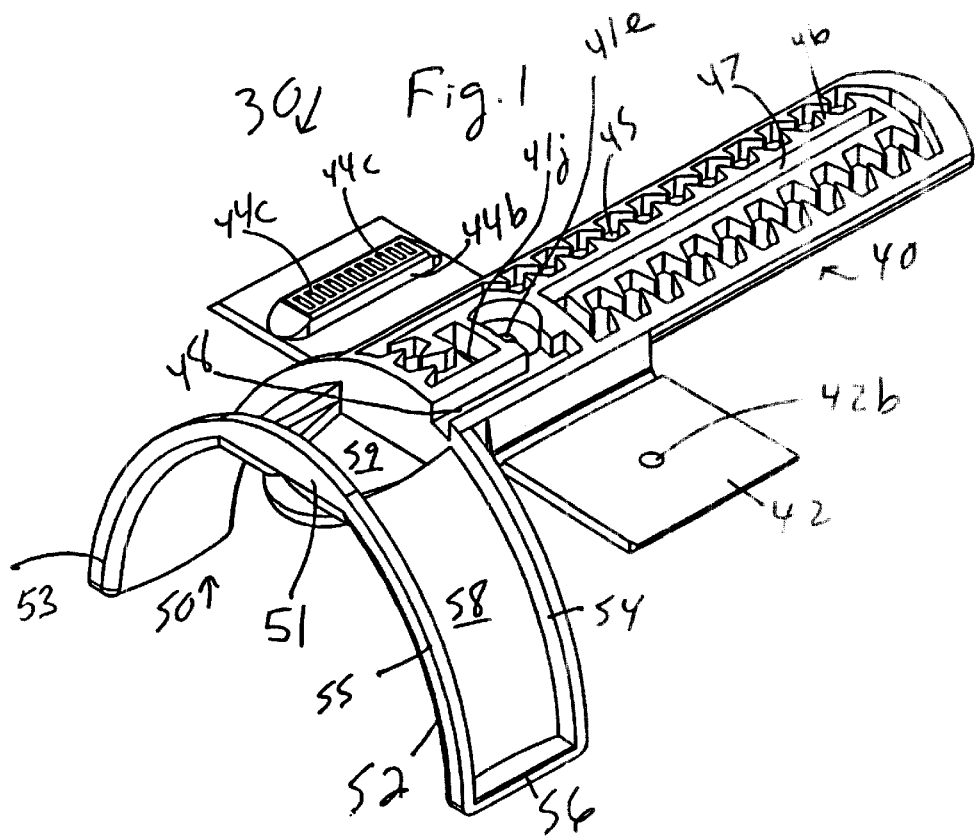
FIG. 1 is a perspective view of the emitter of the present invention.
Figure 4:
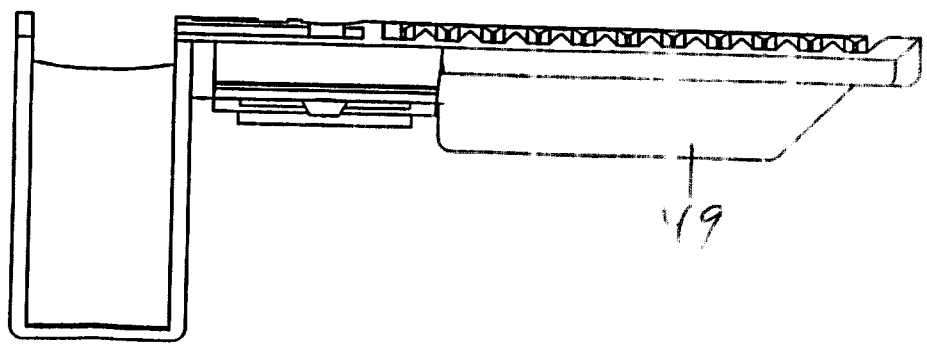
FIG. 4 is a right side elevational view of the emitter shown in FIG. 1.

Referring to the drawings, wherein like numerals represent like parts throughout the several views, there is generally disclosed at 30 an emitter. The emitter consists of two basic sections. The first section is a body section, generally designated at 40 and the second section is an outlet chamber member, generally designated at 50. The body 40 of the emitter 30 controls the flow rate of the emitter 30. The outlet chamber member 50 determines where the exit holes can be drilled into the conduit 100 as will be explained more fully hereafter, the outlet chamber member 50 in conjunction with the inner surface of the conduit 100, shown in FIG. 12, forms a chamber in which water is located that ultimately exits the conduit 100.

The emitter 30 is shown in an unassembled position in FIG. 1 and an assembled position in FIG. 9. The emitter 30 is preferably injection molded as a single one-piece unit. The body 40 has a cavity 41 formed therein. An inner door 42 is operatively connected to an elongate member by a hinge 42a. The hinge 42a is simply a thinner piece of molded plastic that allows the inner door 42 to be folded over on top of the cavity 41. An aperture 42b is formed in the inner door 42. On the underneath side of the inner door 42 is a protrusion 42c. The aperture 42b extends through the inner door 42a and through the protrusion 42c. A plurality of elongate depressions 42d radially extend around the protrusion 42c and are formed in the inner door 42. An outer door 44 is operatively connected to the elongate member 43 by a hinge 44a, similar to the hinge 42a. A raised inlet member 44b is operatively connected to the top of the outer door 44 and a plurality of rectangular openings 44c are formed therein and extend through the outer door 44. On the underneath side of the outer door 44 two elongate strips are formed and extend beyond the planar surface of the outer door 44.

Referring especially to FIGS. 6 through 8, a cavity 41 is shown in more detail. The cavity 41 is in the general space of a cylinder having an open end. The cavity 41 has inner sloped walls 41a proximate its open end that extend generally downward and inward, as viewed in FIG. 8. A ring 41b extends away from the top surface 41c. Similarly, a circular disc 41d extends up away from the top surface 41c. An exit hole 41e is formed and extends through the circular disc 41d. A slot 41f is formed in the disc 41d and extends from the exit ring 41b to the outer perimeter of the disc 41d. As seen in the Figures and specifically referring to FIG. 8, the ring 41b extends further away from the top surface 41c than does the circular disc 41d. Three rectangular indentations 41g are formed in the walls 41a. A second exit hole 41h extends through the walls 41a and extends completely through the elongate member 43. An entrance hole 41j also extends through the entire elongate member 43.

Figure 2:
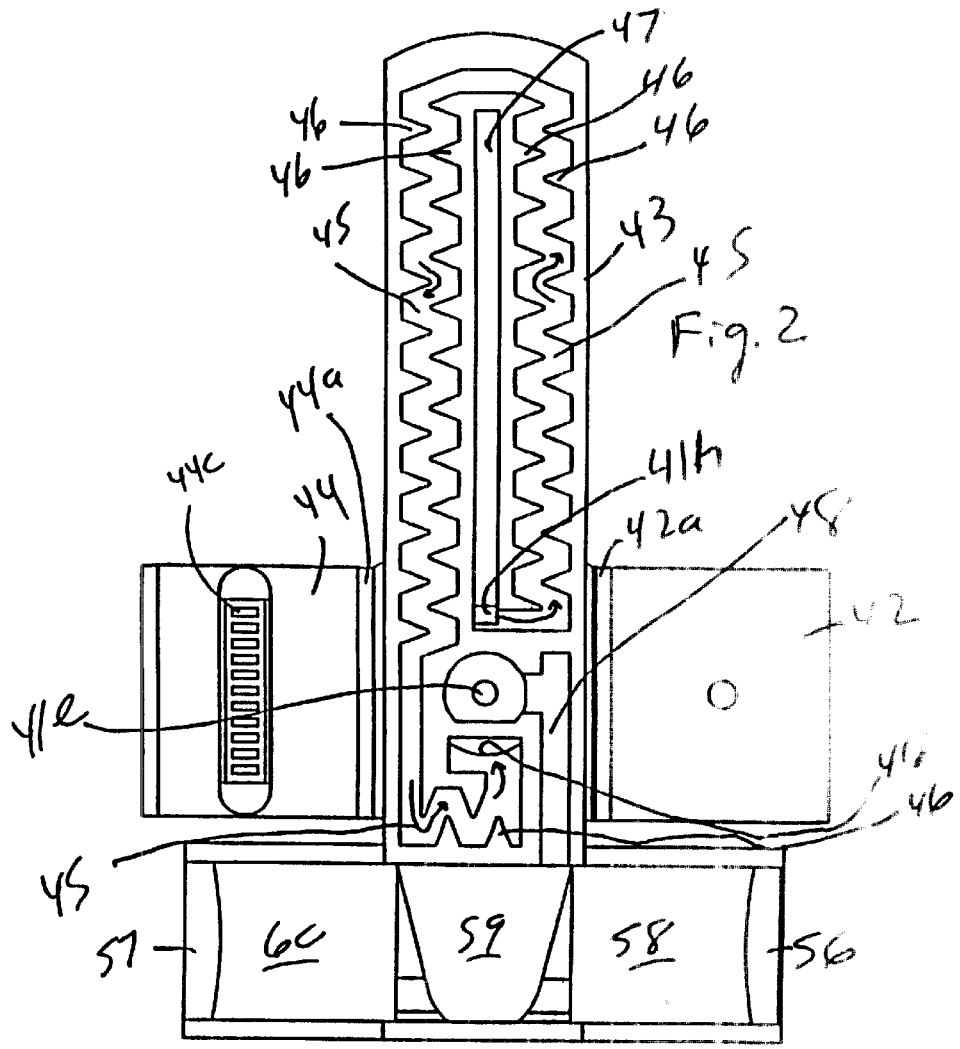
FIG. 2 is a top plan view of the emitter shown in FIG. 1.
Figure 3:
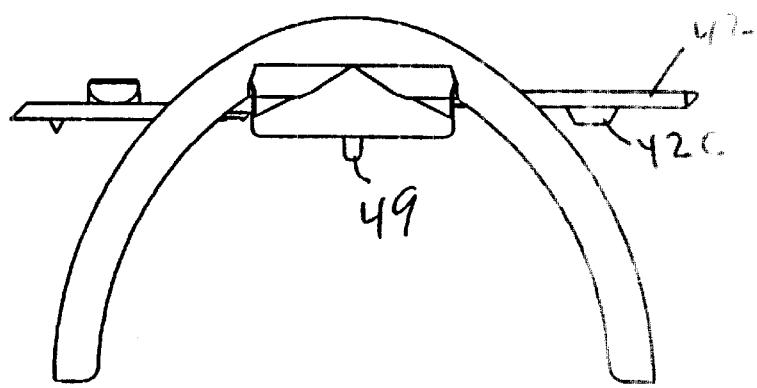
FIG. 3 is a rear elevational view of the emitter shown in FIG. 1.

Referring now especially to FIGS. 1 and 2, a tortuous path 45 is formed between raised chevrons 46. The tortuous path extends from the second exit hole 41h. A straight trough 47 is formed in the elongate member 43 and extends straight out from the second exit hole 41h. As will be described more fully hereafter, the water exiting the exit hole 41h can flow down the trough 47, but there the trough 47 ends and the water then has to eventually flow through the tortuous path 45, through the chevrons 46. The tortuous path 45 extends toward the outlet chamber member 50. As it approaches the outlet chamber member 50 the tortuous path 45 turns 90 degrees past additional chevrons 46 and then again turns 90 degrees and terminates at the entrance hole 41j. An exit channel 48 is formed in the elongate member 43 and extends from the exit hole 41e and empties into the outlet chamber member 50.

The outlet chamber member 50 is operatively connected to the elongate member 43 by suitable means such as being formed as an integral molding with the elongate member 43. The outlet chamber member 50 includes a central portion 51 and a first wing 52 and a second wing 53. Arcuate walls 54, 55 are operatively connected to the end walls 56, 57, which, along with the bottom sections 58, 59, 60 define the outlet chamber member. The outlet chamber member 50, in combination with the conduit 100, forms the exit chamber in which water is located, as will be more fully described hereafter. The bottom of the central portion 51 extends lower than the bottoms 58, 60 of the wings 52, 53. This lower bottom 59 defines a deeper indentation and is spaced further from the inner surface of the conduit 100 than the bottoms 58, 60. The wings 52, 53 are constructed from a material so that they are flexible and can be bent. That is, the end walls 56, 57 can be bent towards one another to create an effective diameter which is less than when they are in there natural state as shown in FIG. 1.

In assembling the emitter 30, a diaphragm 70 is placed, as would be viewed in FIG. 7, on top of the ring 41b. The diaphragm 70 is in the shape of a disc and is constructed from a suitable material such as silicon. A material for the emitter 30 may be any suitable plastic such as a polyethylene or more preferably a linear low density polyethylene to obtain the required flexibility of the wings 52, 53. After the diaphragm 70 has been placed on top of the ring 41b, the inner door 40 is rotated over the cavity 41 and the outer door 43 is rotated on top of the inner door 42. The outer door 43 is then heat-welded to be sealed to the inner door 42 to be in the assembled position, as shown in FIG. 9. The assembled emitter is then assembled inside of the conduit 100, as will be described more fully hereafter.

The path of the water will now be described in detail. The water will flow through the conduit 100 and contact the inlets 44c. The water then goes through the inlets 44c and then through the aperture 42b and is then contained between the inner door 42 and the diaphragm 70. Referring to FIG. 10, the water will then go from between the diaphragm 70 and inner door 42 out the exit hole 41h. The water will then go from the exit hole 41h into the trough 47 and tortuous path 45. The trough 47 is a trough with no exit. Therefore, the water will flow into the trough 47 but eventually must go into the tortuous path 45. A previously described, the tortuous path then continues around until it reaches the entrance hole 41j. The water is then in that part of the cavity 41 between the disc 70 and the top surface 41c. The water path in the figures is shown by a series of arrows.

Referring now to FIG. 11, the path of the water will be continued. It is of course understood that FIG. 11 is utilized so that the water path may be seen more easily, it being understood that FIG. 11 shows the emitter in an unassembled condition. The water moves from the entrance hole 41j around the disc 41d and through the slot 41f until it reaches the exit hole 41e. When the water pressure in the conduit 100 is low, the disc 70 will not be pressed against the disc 41d. In such instances, the water coming in the entrance hole 41j may go directly over the top of the disc 41d to the exit hole 41e. However, as the pressure in the conduit 100 increases, the disc 70 is deformed and pressed against the disc 41d, thereby forcing the water to take the circular route around the disc 41d through the slot 41f. The water then continues from the exit hole 41e through the exit channel 48 to the outlet chamber member 50. The water is then in the exit chamber generally designated at 61. The exit chamber is that chamber defined by the bottom surfaces 58–60, the end walls 56, 57, and the inner surface of the conduit 100. In the exit chamber 61, the water is available for dispersion through one or more exit holes formed in the conduit 100.

Two examples of dispersing the water from the exit chamber 61 are shown in FIGS. 12 and 13. In FIG. 12, there are two outlet or exit holes 80 formed in the conduit 100, by means well known in the art. There is one exit hole 80 that is shown in FIG. 12 and the other exit hole is hidden by the wing 53 and is shown in dashed lines, but is spaced 180 degrees from the exit hole 80 that is shown. The water then exits the holes 80 and drips 90 and irrigates the crops in a manner well known in the art.

However, for some plants, very precise watering is needed, such as for young grapevines. In such situations, the embodiment shown in FIG. 13 is very useful. There, a single exit hole 80' is formed in the conduit 100'. The exit hole 80' is positioned over the bottom surface 59 so that there is a deeper well to access. A fitting 90 having a suitable connector such as a barbed attachment 91 is operatively connected to the conduit 100 through the exit hole 80'. The fitting 90 is in turn connected to a tubing 110 which is able to be positioned precisely at a desired location. By having a deeper indentation, there is room for the barbed end 91 to be inserted into the conduit 100. If the entire outlet chamber member 50 had the same depth as that portion defined by the bottom 59, the flow rate through the conduit to subsequent emitters would be severely limited by closing down the inner diameter bore of the conduit 100 by the extra depth formed by the bottom surface 59. However, the bottom surface 59 only is over a relatively small portion of the diameter of the conduit 100 and therefore does not significantly impact the flow through the conduit 100'.

A suitable method of inserting the emitter 30 into the conduit 100 is shown in FIGS. 14 through 19. A guide, generally designated at 200, includes a circular tube 201 and a slotted track 202 and a guide rod 203. The emitter 30 has a guide member 49 which is elongate and extends below the body 40. The guide member 49 is designed to slide in the track of the slotted track 202. The assembled emitter 30 is brought proximate the end of the tube 201 where a mechanism (not shown) folds the wings 52, 53 into a diameter so that it will fit within the tube 201. The natural configuration of the emitter 30, before assembly, is shown in FIG. 1. It can be seen that the wings 52, 53 are spread further apart and together they would form approximately, in cross section, a 180 degree outlet chamber member. The tube 201 bends the wings 52, 53 so that they almost touch, being just short of a 360 degree outlet chamber member. The guide 200 is positioned through the die head 210 by means well known in the art. The emitters 30 are pushed along the guide 200 by means well known in the art. FIGS. 18, 19 show the emitter 30 as it is exiting the die head 210. It is of course understood that the conduit 100 is being extruded through the die head 210 around the emitter 30, however, the conduit 100 is not shown for clarity purposes. The top of the elongate body 40 will contact the hot extrudate of the conduit 100 and be welded thereto. The wings 52, 53 will spring outward as they exit the tube 201. The tube 201 will have the wings in a tighter configuration than that required by the conduit 100, thereby providing a springing action for the wings 52, 53 to spring outward and to contact the hot extrudate of the conduit 100. This in turn welds the outlet chamber member 50 to the conduit 100. A backing roller (not shown) may be added immediately outside of the exit of the die head. This would assist in helping the body contacting the hot extrudate to assist in the bonding to the conduit 100.

The emitter 30 is able to be used in conduits having various sized diameters. It is not necessary to have a separate emitter for each diameter conduit. For smaller diameters, the wings of the emitter will be closer to touching. For larger diameter of conduits, the wings 52, 53 will spread further apart. It is preferred that the outlet chamber member, when viewed in cross section, will cover at least 225 degrees, and preferably 270 degrees or greater. This will allow two spaced apart exit holes 80 to be drilled into the conduit and still hit the exit chamber 81. The exit holes 80 are preferably 180 degrees, but could be greater or less and still function acceptably.

Referring now to FIGS. 20–26, there is shown another embodiment of the present invention, an emitter 300. The emitter 300, in FIG. 20, is shown secured inside of the conduit 400. The conduit 400 may be any typical conduit, such as a hose used for irrigation purposes. The conduit 400 has an inner surface 400a. The inner surface 400a defines the bore 400b through which the fluid, or water, is carried by the conduit 400. The conduit 400 is shown broken away, it being understood that the inner surface 400a is continuous and forms a circle, oval or other suitable shape. The emitter 300 is of the type that is often referred to as a "boat" emitter. The emitter 300 is operatively connected to the inner surface 400a of the conduit 400 by means well known in the art. The emitter 300 is typically inserted into the conduit 400 as it is being extruded, thereby heat welding the emitter 300 to the inner surface 400a. The emitter 300 is a pressure compensating emitter and utilizes a resilient disc 301. The disc 301 is made of any suitable material, well known in the art. The disc 301 is only shown in FIG. 25 and has been removed in the remainder of the figures for clarity.

The emitter 300 has a central body section 310 and a first distal chamber member 330 and a second distal chamber member 350. The emitter 300, with the exception of the resilient disc 301, is preferably formed as a single one-piece part. The central body section 310 includes a hinged cover 311. The cover 311 includes a planar member 311a that is generally rectangular in shape. An inlet is formed in the hinged cover 311. The inlet includes an upper raised portion 311b and a lower protruding portion 311c. A bore 311d extends through the portions 311b, 311c and forms the inlet for the emitter 30. An energy directing member 312 protrudes downward from the inner surface of the planar member 311a and is in the general shape of a ring. There is an opening 312a formed in the member 312 positioned over the first end 314a of pathway 314, as will be described more fully hereafter. A reservoir 313 is formed in the body section 310. The reservoir 313 is underneath the inlet 311d. The reservoir 313 is generally cylindrical in shape and has a ledge 313a formed around its inner wall. The ledge 313a provides for a support for the resilient disc 301. The disc 301 divides the reservoir 313 into an upper cavity 313b and a lower cavity 313c. The portion 311c presses against the disc 301 around the ledge 313a and therefore provides a seal so that no water is transferred directly from the upper cavity 313b to the lower cavity 313c. The portion 311c will keep the disc 301 from floating. In one embodiment, the portion 311c just touches the disc to prevent the disc from floating. In another embodiment, the portion 311c is longer and places a preload on the disc. This is advantageous for when the irrigation system is shut down, water will not bleed out. A pressure reducing pathway 314 is formed in the body section 310. The pathway 314 has a first end 314a that is in fluid communication with the upper cavity 313b. When the cover 311 is closed, the opening 312a is proximate the first end 314a of the pathway 314 and thereby allows water into the pathway 314. The pathway 314 provides for a tortuous path for the water and reduces the pressure as the water moves from the first end 314a to the second end 314b. The second end 314b terminates at a bore 315 which extends through the body section 310, as shown in FIGS. 23 and 24. A groove 329 is formed to mate with the energy director 312, so that when the door is welded shut, the energy directors melt in the groove and seal the cover to the body section 310.

The emitter 300 has a contact surface 316. The contact surface 316 extends the length of the emitter and comes in contact with the conduit 400 and is used to secure the emitter 300 to the conduit 400. The contact surface 316 is at a slight radius to substantially match the inner radius of the conduit 400. A central trough 317 extends the length of the body section 310 and extends into the distal chamber members 330, 350. A second trough 318 is formed in the contact surface 316 and places the bore 315 in fluid communication with an opening 319. The opening 319 extends from the trough 318 into the lower cavity 313c. The other five troughs 320–324 are non-functional and are used to reduce the amount of material used in making the emitter 300.

The distal chamber members 330, 350 are mirror images of each other and only one will be described in detail. The first distal chamber member 330 extends from one end of the body section 310 and the second distal member 350 extends from the other end of the body section 310. The distal chamber member 330 has an outer surface 331 and a first chamber 332 defined by a bottom wall 333 and a side wall 334. The first chamber 332 has a height X which is defined as the distance from the bottom wall 333 to the inner surface 400a. As viewed in FIG. 25, the distances measured as an extension from the contact surface 316. The contact surface 316, where the distance X is shown in FIG. 25, appears higher because of the curved nature of the contact surface 316. The thickness Y of the body section is the distance from the contact surface 316 to the top of the upper raised portion 311b. The second chamber 352 is comparable to the first chamber 332. As can best be seen in FIGS. 23, 24, the central trough 317 opens into the first and second chambers 332, 352 placing the chambers 332, 352 in fluid communication with the trough 317.

The lower cavity 313c has an opening 325 that extends to the trough 317, thereby placing the lower cavity 313c in fluid communication with the trough 317. The opening 325 is formed in a raised portion 326 on the bottom of the cavity 313c. The raised portion 326 has a top surface 326a and the bottom of the lower cavity 313c has a surface 327. A slot 328 is formed in the raised portion 326 and extends to a depth to be in alignment with the surface 327.

Figure 21:
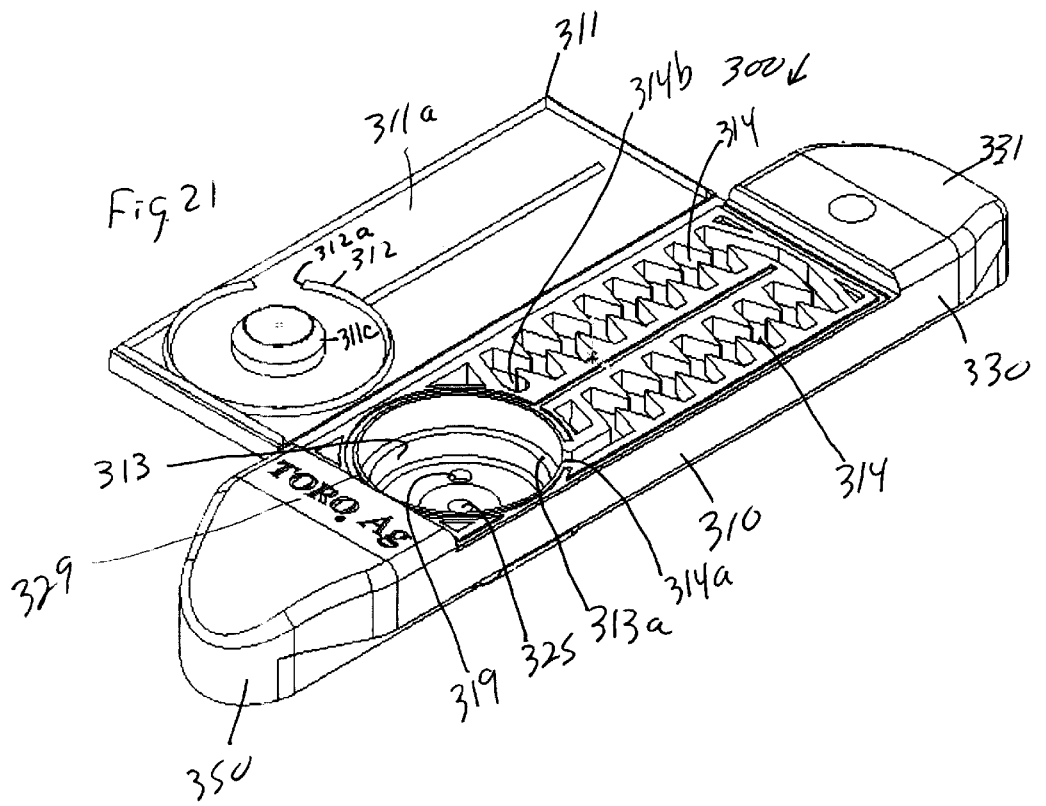
FIG. 21 is a perspective view of the emitter shown in FIG. 20, with the door in an open position.
Figure 22:
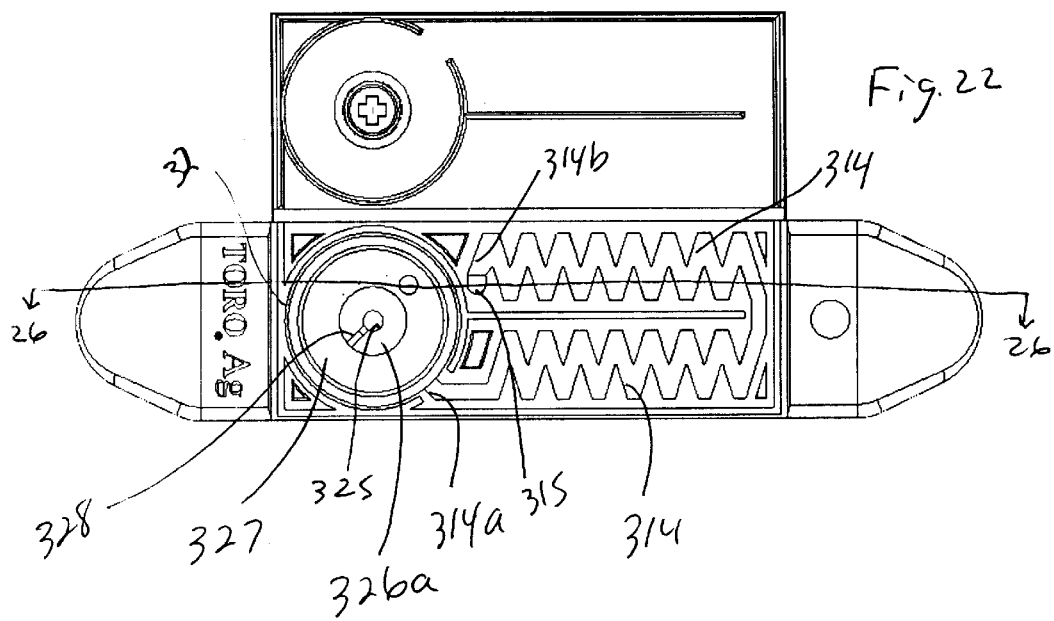
FIG. 22 is a top plan view of the emitter shown in FIG. 20.

In constructing the emitter 300, the resilient disc 301 is placed in the reservoir 313 and the hinge cover 311 is rotated from the open position, shown in FIG. 21 to the closed position, shown in FIG. 20. The cover is then secured by suitable means such as sonic welding. The emitter is then placed in the conduit 400 at the desired intervals by means well known in the art. There the contact surface 316 is heat welded to the inner surface 40a of the conduit 400, usually as the conduit 400 is being extruded. In use, water would be flowing through the bore 400b of the conduit 400 and would enter the inlet or bore 311d. The water would then be in the upper cavity 313b, where its only exit is to the first end 314a of the pressure reducing pathway 314. The water then travels through the pathway 314 and exits the second end 314b through bore 315 into the trough 318. The water then goes from the trough 318 out of opening 319 into the lower cavity 313c. In FIG. 25, the resilient disc 301 is shown in a position where the pressure has deformed the disc downward. The ledge 313a keeps the outer periphery of the disc 301 in position and does not allow it to go downward, only the center portion of the disc is depressed by the pressure. When in a non-deflected position, the water may exit the lower cavity 313c through the opening 325. However, when the pressure in the conduit 400 increases, the disc 301 will deflect and close the opening 325. Then, the passageway for the water is through the slot 327 into the opening 325, where it continues and enters into the through 317. From the trough 317, the water flows to the first chamber 332 and second chamber 352. Exit holes (not shown) are then formed in the conduit 400 by suitable means and are positioned over the chambers 332, 352. Similar to that described previously, the exit holes could be similar to exit holes 80 as described with respect to FIG. 12. Also, the exit holes could be similar to exit holes 80' as described in FIG. 13 so that a fitting 90 may be secured. The fitting 90 has a suitable connector such as a barb attachment 91 which is operatively connected to the conduit through the exit hole. The depth of the first and second chambers 332, 352 provide for sufficient clearance for the barbed end 91 to be inserted into the conduit 400. The height of the chambers 332, 352 is at least 25 percent of the thickness of the body section 310, and is preferably at least 40 percent and more preferably at least about 50 percent.

The outer surface 331 of the end section are curved, and provide for a smooth transition and minimize hydraulic losses. The curved portion of the outer surface 331 is seen in the cross sections in FIGS. 25 and 26. The outer surface 331 increases in height as it moves away from the end of the emitter 300. Further, as best seen in the top plan views of FIGS. 22 and 23, the outer surface also is tapered to be narrower at the end. These two combinations provide for the smooth transition that minimizes hydraulic loss. Further, it is these end sections where the deeper pockets of the chambers 332, 352 are formed to be substantially the full height of the emitter at that section of the emitter. This also helps to minimize the amount of plastic in the part as thicker sections are not desirable in molded plastic parts.

The height X of the chambers 332, 352 in one embodiment is 0.208 inches and the thickness Y of the emitter 300 is 0.335 inches or the height X is 63.6 percent of the thickness Y. In another embodiment, the height X is 0.178 inches and the thickness Y is 0.305 inches or the height X is 58 percent of the thickness Y. Prior art emitters do not allow for the insertion of a fitting or barb and have a height which is approximately 16.6 percent of their thickness.

Depending upon the design of the fitting and approximate height needed is $3/32$ of an inch or 0.09375 inches. There needs to be sufficient distance from the end of the barb or fitting to the bottom of the chamber so as to not block the flow of water into the fitting or barb. The height X is preferably at least $3/32$ of an inch and more preferably 0.125 inches or greater or even more preferably 0.158 inches or more.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A drip irrigation emitter, the emitter operatively connected in a bore of a conduit having an inner wall with a circumference, the emitter comprising:
   a) a body section, comprising:
      i) a body member having an inlet formed in the body member, the inlet in fluid communication with the bore of the conduit;
      ii) an outlet;
      iii) a pressure reducing passageway in fluid communication with the inlet and the outlet; and
      iv) the body section having a contact surface, the contact surface for operatively connecting the emitter to the conduit, the contact surface sized to be in contact with less than 180 degrees of the circumference of the inner wall;
   b) a first outlet chamber member operatively connected to the body section, the first outlet chamber member comprising:
      i) a bottom wall operatively connected to a side wall;
      ii) the bottom wall, side wall and inner wall of the conduit forming a first chamber and the first chamber has a height, from the bottom wall to the inner wall of the conduit; and
      iii) the first chamber having an opening in fluid communication with the outlet of the body section;
   c) the height of the first chamber is at least 25 percent of the thickness of the body section, thereby allowing for insertion of a fitting through the conduit into the first chamber.

2. The drip irrigation emitter of claim 1, wherein the height of the first chamber is at least 40 percent of the thickness of the body.

3. The drip irrigation emitter of claim 2, wherein the height of the chamber is at least 50 percent of the thickness of the body.

4. The drip irrigation emitter of claim 1, further comprising a second outlet chamber member operatively connected to the body section, the second outlet chamber member comprising:
   a) a bottom wall operatively connected to a side wall;
   b) the bottom wall, side wall and inner wall of the conduit forming a first chamber and the chamber has a height, from the bottom wall to the inner wall of the conduit; and
   c) the first chamber having an opening in fluid communication with the outlet of the body section.

5. The drip irrigation emitter of claim 1, further comprising:
   a) a reservoir formed in the body section, the reservoir positioned between the inlet and outlet;
   b) a resilient member supported across the reservoir, wherein the reservoir has a first cavity and a second cavity;
   c) the pressure reducing passageway having a first end in fluid communication with the first cavity and a second end in fluid communication with the second cavity; and d) wherein when pressure in the conduit increases, the resilient member deflects toward the outlet, thereby compensating for pressure changes in the conduit.

6. A pressure compensating drip emitter, the emitter operatively connected in a bore of a conduit having an inner wall with a circumference, the emitter comprising:
   a) a body section comprising:
      i) a body member having an inlet formed in the body member, the inlet in fluid communication with the bore of the conduit;
      ii) an outlet;
      iii) a pressure reducing passageway in fluid communication with the inlet and the outlet; and
      iv) the body section having a contact surface, the contact surface for operatively connecting the emitter to the conduit, the contact surface sized to be in contact with less than 180 degrees of the circumference of the inner wall;
   b) a resilient member supported across the reservoir, wherein the reservoir has a first cavity and a second cavity;
   c) the pressure reducing passageway having a first end in fluid communication with the first cavity and a second end in fluid communication with the second cavity; and
   d) wherein when pressure in the conduit increases, the resilient member deflects toward the outlet, thereby compensating for pressure changes in the conduit;
   e) a first outlet chamber member operatively connected to the body section, the first outlet chamber member comprising:
      i) a bottom wall operatively connected to a side wall;
      ii) the bottom wall, side wall and inner wall of the conduit forming a first chamber and the first chamber has a height, from the bottom wall to the inner wall of the conduit; and
      iii) the first chamber having an opening in fluid communication with the outlet of the body section;
   f) the height of the first chamber is at least 25 percent of the thickness of the body section, thereby allowing for insertion of a fitting through the conduit into the first chamber; and
   g) wherein when pressure in the conduit increases, the resilient member deflects toward the outlet, thereby compensating for pressure changes in the conduit.

7. The drip emitter of claim 6, further comprising a second outlet chamber member operatively connected to the body section, the second outlet chamber member comprising:
   a) a bottom wall operatively connected to a side wall;
   b) the bottom wall, side wall and inner wall of the conduit forming a first chamber and the chamber has a height, from the bottom wall to the inner wall of the conduit; and
   c) the first chamber having an opening in fluid communication with the outlet of the body section.

8. The drip emitter of claim 7, wherein the height of the first chamber is at least 40 percent of the thickness of the body.

9. The drip emitter of claim 8, wherein the height of the chamber is at least 50 percent of the thickness of the body.

10. A drip irrigation emitter, the emitter operatively connected in bore of a conduit, the emitter comprising:
    a) a body section, comprising:
       i) a body member having an inlet formed in the body member in fluid communication with the bore of the conduit;
       ii) an outlet;
       iii) a pressure reducing labyrinth in fluid communication with the inlet and outlet;
       iv) the body member having a cross-section that is less than 180 degrees of a cross-section of the conduit; and
    b) an outlet chamber member operatively connected to the body section, the outlet chamber member comprises:
       i) a curved section, the curved section and the conduit defining a chamber;
       ii) an opening in the chamber, the opening in fluid communication with the outlet of the body section; and
       iii) the curved section extending more than 180 degrees around the bore of the conduit.

11. The emitter of claim 10, wherein the curved section extends more than 225 degrees around the bore of the conduit, wherein two generally circumferentially displaced exit holes may be formed in the conduit and be in fluid communication with the outlet chamber.

12. The emitter of claim 10, wherein the curved section has at least one free end, the free end flexible and is deformable to be used in conduits having different diameters.

13. A drip irrigation emitter, the emitter operatively connected in a bore of a conduit, the bore having a generally circular cross-section, the emitter comprising:
    a) a body section, comprising:
       i) a body member having an inlet formed in the body member in fluid communication with the bore of the conduit;
       ii) an outlet;
       iii) a pressure reducing labyrinth in fluid communication with the inlet and outlet;
       iv) the body member having a cross-section that is less than 180 degrees of a cross-section of the conduit; and
    b) an outlet chamber member operatively connected to the body section, the outlet chamber member comprises:
       i) a curved section, the curved section and the conduit defining an outlet chamber;
       ii) an opening in the chamber, the opening in fluid communication with the outlet of the body section;
       iii) the curved section extending more than 180 degrees around the bore of the conduit; and
       iv) the curved section having a bottom member, the bottom member having a first section and a second section, wherein the first section is located to provide a greater depth for the chamber than the second section, thereby allowing for insertion of a fitting into the chamber proximate the first section.

14. The emitter of claim 13 in which the emitter provides an area for insertion of a fitting into the exit hole area.

* * * * *